United States Patent [19]
Nejsum

[11] Patent Number: 6,131,821
[45] Date of Patent: Oct. 17, 2000

[54] FIELD SPRAYER

[75] Inventor: Lars Nejsum, Bettendorf, Iowa

[73] Assignee: Hardi International A/S, Taastrup, Denmark

[21] Appl. No.: 09/155,874

[22] PCT Filed: Apr. 9, 1997

[86] PCT No.: PCT/DK97/00151

§ 371 Date: Mar. 15, 1999

§ 102(e) Date: Mar. 15, 1999

[87] PCT Pub. No.: WO97/37533

PCT Pub. Date: Oct. 16, 1997

[30] Foreign Application Priority Data

Apr. 10, 1996 [DK] Denmark .................................. 0406/96

[51] Int. Cl.$^7$ ...................................................... B05B 1/20
[52] U.S. Cl. ............................................ 239/168; 239/168
[58] Field of Search ...................................... 239/157–159

[56] References Cited

U.S. PATENT DOCUMENTS 4,650,124   3/1987   Connaughty ......................... 239/157 X

FOREIGN PATENT DOCUMENTS

| 85597 | 8/1983 | European Pat. Off. ............... 239/159 |
| 0 343 547 | 11/1989 | European Pat. Off. . |
| 2 014 834 | 9/1979 | United Kingdom . |
| 2 028 078 | 3/1980 | United Kingdom . |
| 2191922 | 12/1987 | United Kingdom ................... 239/157 |

OTHER PUBLICATIONS

S. Howe, "Sprayers for Fertilizer in Suspension or Solution", Power Farming 56 (11), 1997.

Primary Examiner—Kevin Weldon
Attorney, Agent, or Firm—Finnegan, Henderson, Farabow, Garrett & Dunner, L.L.P.

[57] ABSTRACT

An agricultural appliance, in particular a field sprayer, that includes a boom construction (1) with a central portion (20) which may, by means of a suspension device, be mounted on a support construction (40), such as a tool bar on a tractor or the like, which is located posteriorly of the boom construction (1). The suspension device includes a pivot (150) that allows for turning of the boom construction (1) about the axis of the pivot which extends substantially perpendicularly to the boom construction (1) and horizontally. The agricultural appliance has a system of at least two rigid push/pull rods or struts (35–38), each of which connects a point on the boom construction (1) to a posteriorly located point on the posteriorly arranged support construction (40) by means of swivel joints (39), said push/pull rods (35–38) being so arranged that at least one rod is influenced by a pull simultaneously with at least one other rod being influenced by a pressure by turning of the boom construction (1) about the pivot axis (150).

9 Claims, 5 Drawing Sheets

FIELD SPRAYER

BACKGROUND OF THE INVENTION

1. Field of the Invention

The present invention relates to a system for attenuating the oscillations of a boom construction for an agricultural appliance, in particular for a field sprayer. In particular, the invention relates to an agricultural appliance with a boom construction that comprises a central portion which may, by means of a suspension device, be mounted on a support construction, such as a tool bar on a tractor or the like, which is arranged posteriorly of the boom construction, said suspension device comprising means that at least allow turning of the boom construction about an axis which is substantially perpendicular to the boom construction and which extends horizontally. "Posteriorly" is used herein to designate a support construction which is situated in a displaced parallel direction relative to the direction of advancement of the appliance.

2. Description of the Related Art

Usually agricultural appliances of this kind have a boom construction which is unsupported at its extremities in order to minimise the damage to the crops during the advancement of the agricultural appliance across a field by means of a tractor. Therefore the boom construction must be suspended on the tractor in a very specific manner, since it is necessary take into account that the suspension system of the boom construction must be able to absorb and attenuate the movements of the driving tractor so as to prevent them from being transmitted directly to the boom construction, and at the same time the system must ensure that the boom construction extends horizontally at any time, or alternatively at a given pitch. To this end the boom construction is usually suspended by means of a pendulum arm that extends perpendicularly to the longitudinal extent of the construction, and which is suspended in a centre of suspension which is somewhat above the centre of gravity of the boom construction whereby the boom construction will oscillate like a pendulum.

Examples of such suspension system are described in Swedish patent No. 421 853, French patent No. 1 564 543 and in British patent No. 2 028 078. "Power Farming", Vol. 56, No. 11, Nov. 1977, p. 57 also teaches a suspension system with a pair of bar elements ("C" in the photography) that extends in a vertical plane.

In order to provide a further bracing of the boom construction, it has been provided with a system of parallel rods which extend perpendicularly to the boom construction and in a horizontal plane, which rods are connected to the permanent tool bar on the tractor and the boom construction, respectively (cf. e.g. the above-cited British patent). When the boom construction turns, the bars will always extend in a mutually parallel manner and follow the boom construction when the latter turns.

SUMMARY OF THE INVENTION

The present invention provides a suspension device of the kind described in the introductory part, said suspension being characterised in a system consisting of at least two rigid push/pull rods each connecting a point on the boom construction to a posteriorly located point on the posteriorly arranged support construction by means of swivel joints, said push/pull rods being so arranged that at least one bar is influenced by a pull simultaneously with at least one other bar being influenced by a push by turning of the boom construction about said axis.

The swivel joints are preferably in the form of ball bearings whereby the rods are permitted to move completely freely.

Hereby improved utilisation of the constructive elements of the support construction and the boom construction is obtained in the absorption or attenuation of the forces to be transmitted between the tractor and the boom construction. When the boom construction pivots about the horizontal axis it has surprisingly been found to be possible to provide a favourable attenuation of the oscillations occurring by arranging a system of booms as described above, wherein the forces may be utilised to counteract the pivoting of the boom construction about a horizontal axis. Said interaction between the forces in the booms does not occur when they extend mutually parallel like in the prior art.

According to an advantageous embodiment the geometric configuration of the system of rigid push/pull rods may be varied. In this manner it is allowed in a particularly advantageous manner to meet a requirement among the users to be able to adjust the rigidity of the systems to a certain extent and in certain situations in accordance with the terrain over which the agricultural appliance is to be advanced. Alternatively it becomes possible for the manufacturer—depending on the boom construction—to carry out an adaptation to predetermined terrain conditions.

The suspension device according to the invention is particularly suitable for providing a further or supplementary attenuation of the oscillations in connection with commonly known suspension systems, e.g. of the types described above. The system of push/pull rods is configured and arranged such as to entail a series of forced deformations of the boom construction itself, in particular in a central portion thereof, and of the support construction. The boom construction will simultaneously move away from its usual vertical plane, a movement being imposed thereon in which the boom construction turns about an approximately vertical axis of rotation when one of the push/pull rods moves away from its usual resting position and passes through a position in which it extends perpendicularly to the boom construction.

According to the invention the provision of a substantially horizontally oriented rod system will provide a very simple construction which is readily mounted and serviced.

The invention also relates to a method for attenuating oscillations, which method is characterised in that movements of the support construction are converted to a controlled turning of the boom construction about said horizontal axis and a substantially vertically extending axis.

According to a particularly preferred embodiment, the attachment sites for the push/pull rods may provided in the horizontal booms of an existing boom construction as a series of bores or the like attachment sites in the horizontal booms, said bores having a mutual distance adjusted to suit the application of the agricultural appliance, whereby at least one rod may be influenced by a pull while at least one second rod is influenced by a push by rotation of the boom construction abut said axis.

BRIEF DESCRIPTION OF THE DRAWINGS

The invention will now be described in further detail with reference to the drawings, wherein.

DETAILED DESCRIPTION OF THE PREFERRED EMBODIMENT

Figure 1:
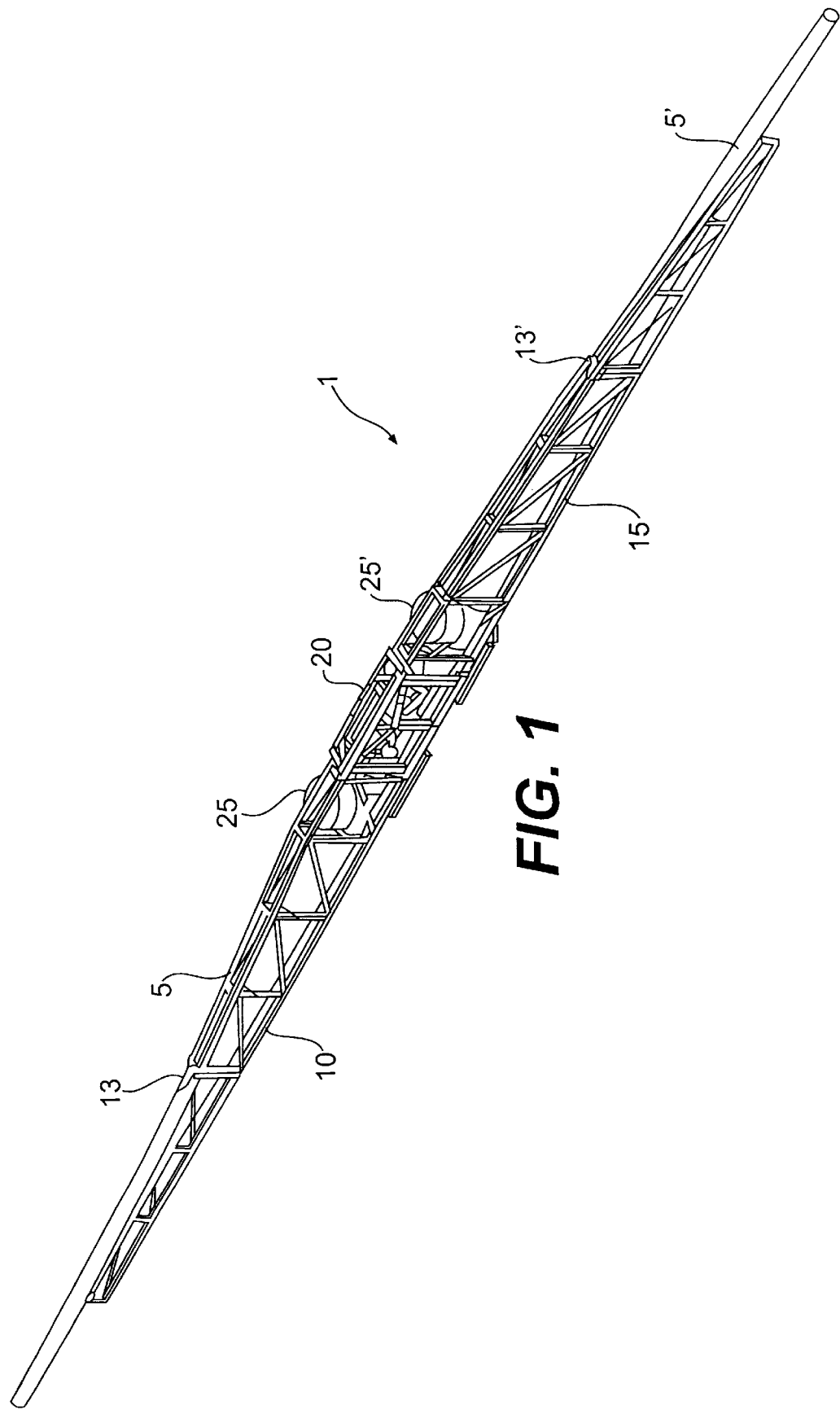
FIG. 1 is a perspective view of a boom construction with two boom sections, seen in the direction of advancement.

The boom construction generally designated by the reference numeral 1 in FIG. 1 is intended for being mounted on a permanent tool bar portion on a not shown tractor or trailer provided with the elements necessary for operating a field sprayer, such as described in e.g. international patent application No. DK94/00469 or Australian patent application No. 14546/83, including pumps and one or more receptacles for spraying agent or water. The illustrated boom construction may have collapsible boom sections 10,15 which may each have a length of e.g. 12 meters. In particular the boom construction may be of the type that carries a flexible air hose 5, like in said international patent application, or alternatively and as shown, two air hoses 5,5', but of course it may also be useful for conventional field sprayers which are not air-assisted.

In addition to the boom sections 10,15 which may also be jointed by a number of joints as indicated by 13,13', the boom construction 1 also comprises a central portion 20 that include the jointed connections 8 necessary for the collapsing, and devices for attenuating the oscillations occurring during the advancement of the appliance across a field by means of a tractor, as will be described in further detail below. As shown the boom construction may be configured in a conventional manner as a grid construction and in addition to the air hose shown, it is configured for carrying hoses and nozzles for ejecting spraying liquid.

Figure 2:
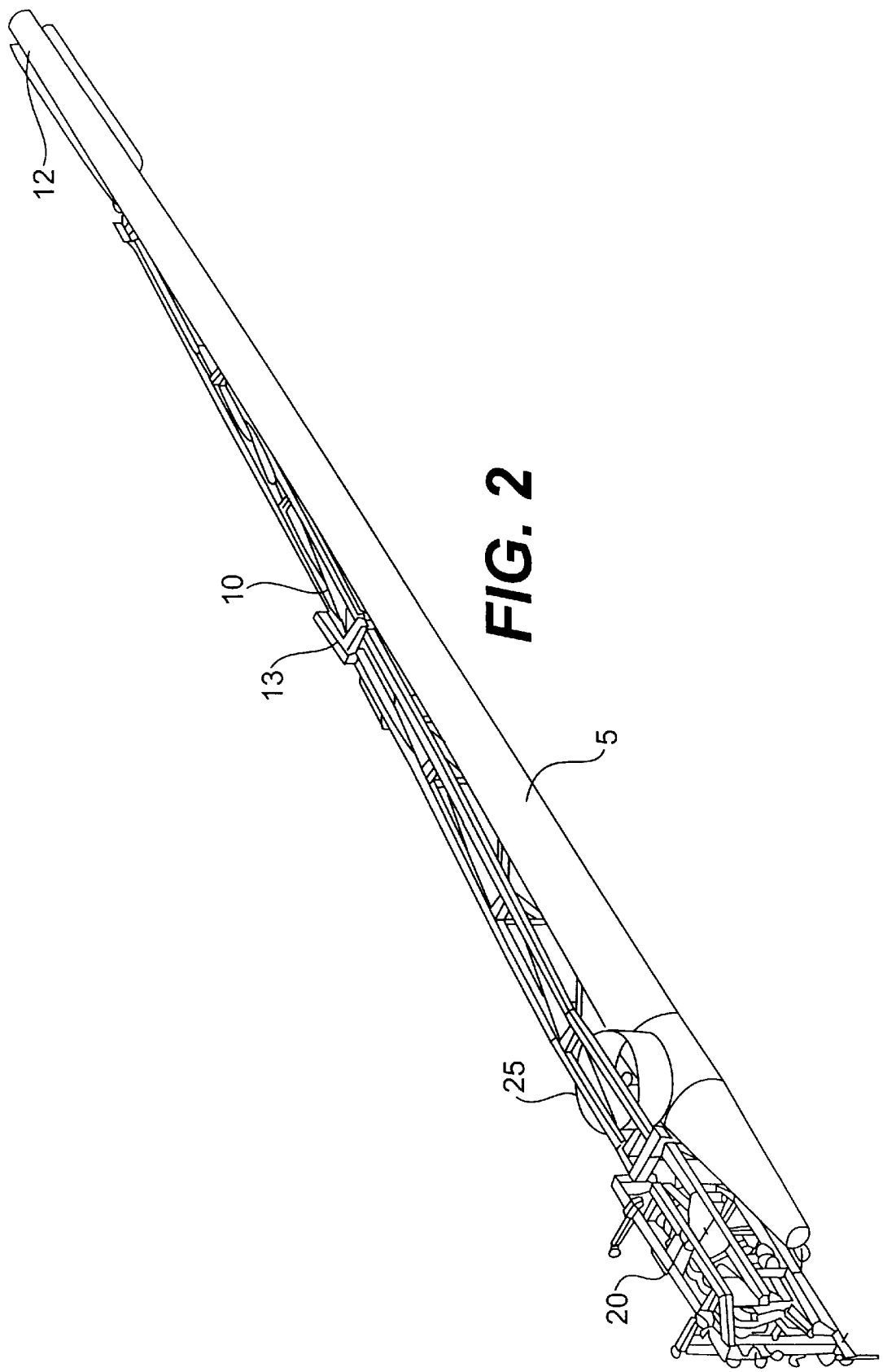
FIG. 2 is a perspective view of a boom section.

FIG. 2 is a more detailed view of the boom section 10 and the central portion 20. As shown the boom section 10 comprises a separate air blower 25 and an air hose 5 that is cut off at the ends and which extends from the central portion 20 to the extremity 12 of the boom section 10. The air blower 25 is mounted immediately at the end of the boom section where it is embedded on the central portion 20, but of course it may be located anywhere along the boom section to provide the desired flow conditions inside the air hose. On its underside the air hose is provided with air outlets which may e.g. be of the kind shown in the above-mentioned Australian or international patent applications.

Figure 3:
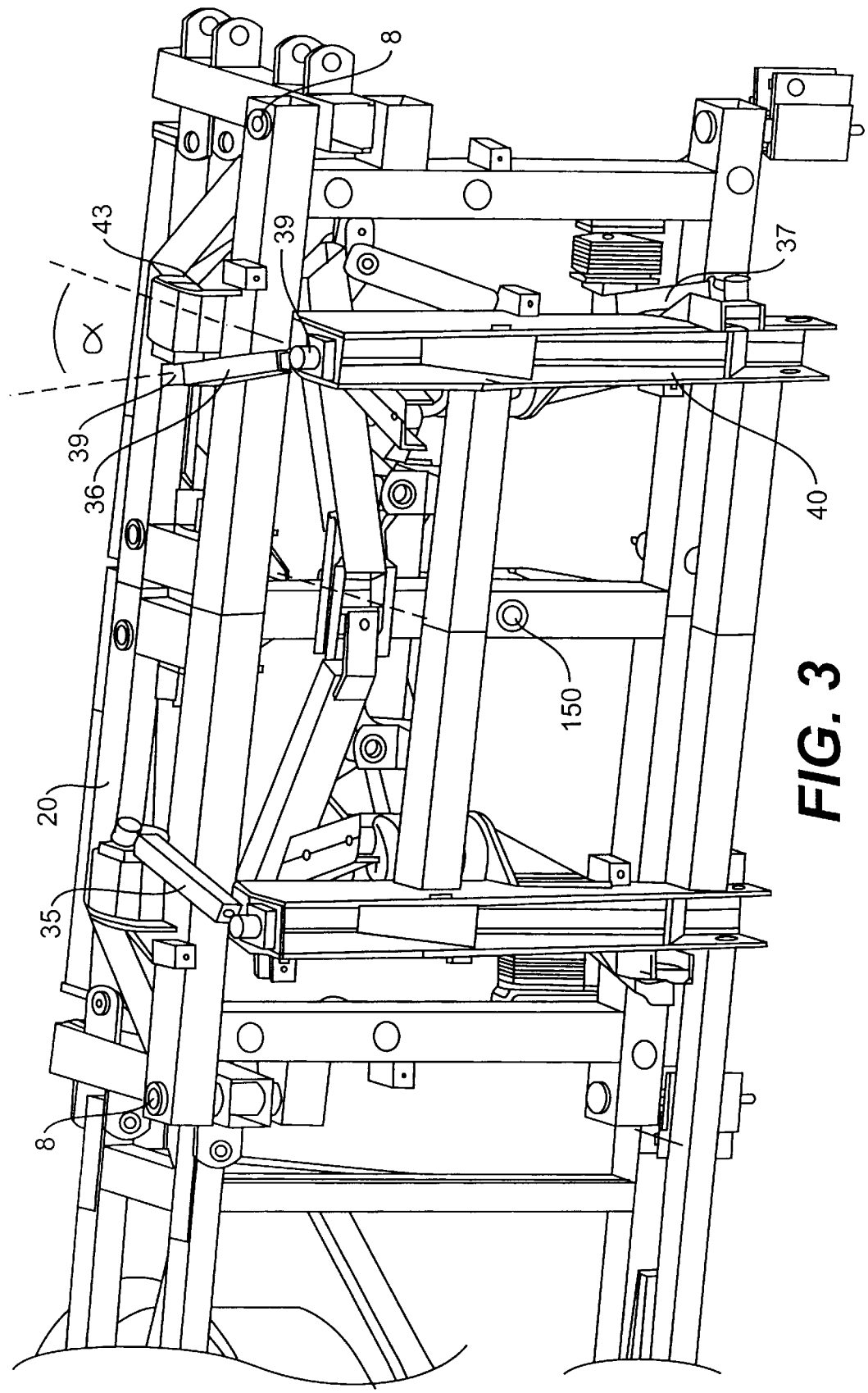
FIG. 3 is a perspective view of the central portion of the boom construction.

The principle shown in FIG. 2 where each of the two boom sections 10,15 is provided with an air hose and an air blower 25 arranged in the vicinity of the central portion 20 may advantageously be applied to field sprayers where it is necessary to be able to oscillate one boom section upwards or downwards in the vertical plane by means of actuators, irrespective of the position of the other boom section. In this situation the boom sections will be connected to the central portion 20 via swivel joints that allow pivoting about a horizontal axis. Such construction is illustrated in further detail in FIG. 3 illustrating that at the top of the central portion 20 and to the left and to the right, flange portions are mounted which may serve to join the boom sections to the central portion. The swivel joint connection may of course be situated at the bottom of the central portion. The advantage of using two separate air hoses 5 with an associated air blower 25 is that it enables said pivotal movement of each boom section 10,15. This pivotal movement cannot be performed when the field sprayer has only one air blower, cf. e.g. Australian patent application No. 14546/83, since the pivotal movement entails that the air hose collapses in its pivoting point and thereby blocks the passage of air.

FIG. 3 is a perspective view of the central portion 20 of the boom construction 1, while simultaneously illustrating a section of the fixed tool bar section 40 on the tractor or trailer on which the boom construction 1 is to be mounted. If the boom construction is mounted on e.g. the tractor by means of a usual three-point suspension, said tool bar portion 40 will constitute the portion which is mounted immovably relative to the tractor. The central portion 20 of the boom construction 1 is connected to the fixed tool bar portion 40 via a swivel joint 150 with an axis of rotation that extends substantially horizontally and in the direction of advancement. The swivel joint 150 serves i.a. to ensure that the boom construction will at any time extend horizontally in its unfolded state.

Figure 5:
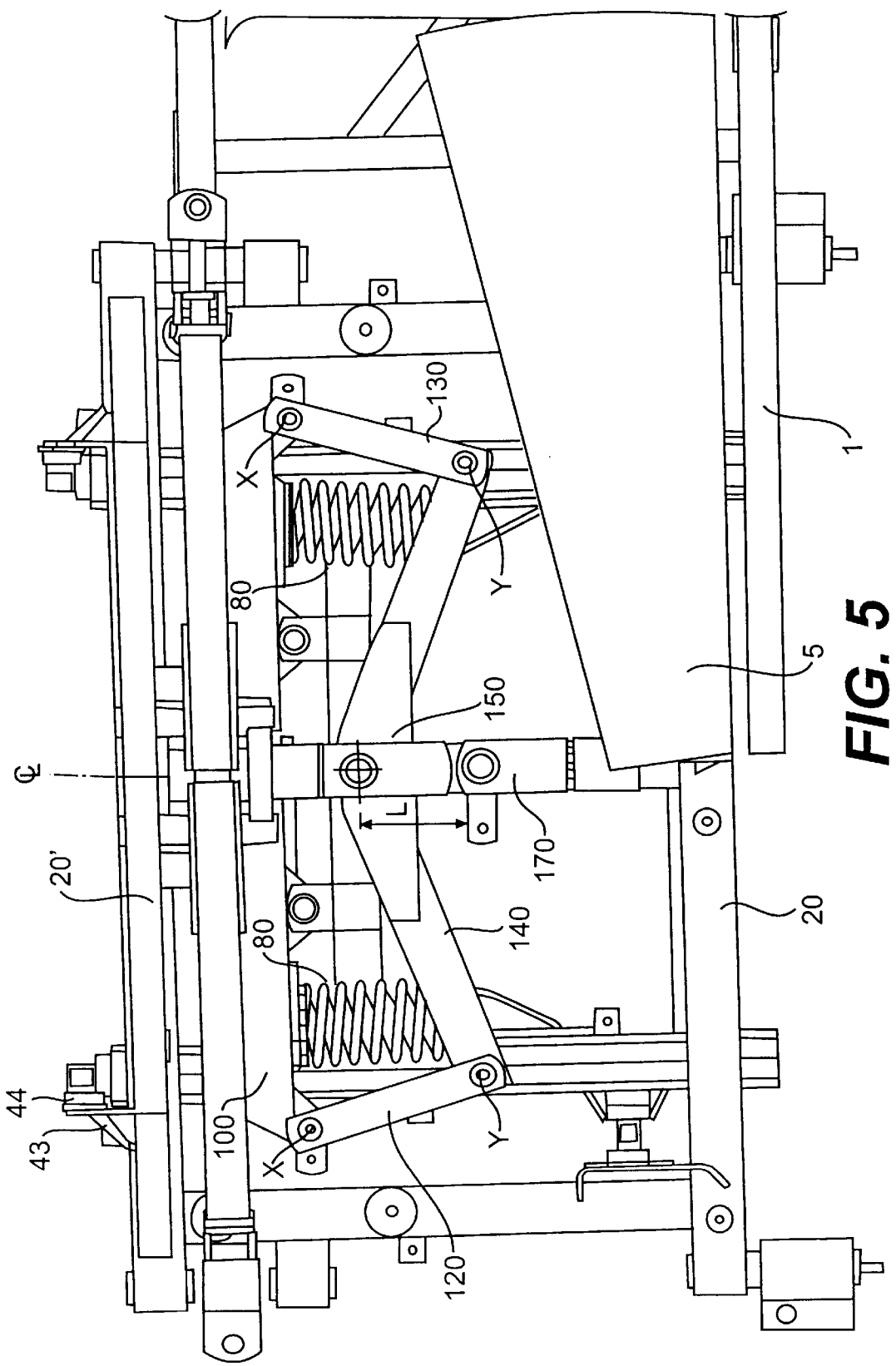
FIG. 5 illustrates the suspension device according to the invention used in connection with a further double-acting suspension construction.

The central portion 20 of the boom construction 1 may advantageously be connected to the fixed tool bar portion 40 via the swivel joint 150 and a series of independent attenuating systems which are, as described above, to initially attenuate the effect of the tractor movements so as to prevent them from being transmitted directly to the boom construction. In the example shown two attenuating systems A and B, which will be described in further detail below with reference to FIG. 5, are used in addition to the attenuating system according to the present invention which is subject to more detailed description in the following.

FIG. 3 shows an embodiment of the rod or strut system 30 according to the invention. As shown the rod system 30 may consist of an upper and a lower pair of rods or struts 35 and 36, 37 and 38 (not shown), wherein the bars of each pair converge towards each other. Alternatively a single pair of rods may be used, e.g. only rods 36 and 37, optionally supplemented by a pair of parallel rods.

The rods each connect the fixed tool bar portion 40 to the boom construction 1. As will appear each rod form a respective angle α with the longitudinal direction of the boom construction. This angle is different from 90°. The rods are configured to be adjustable in order to optionally provide a desired angle α within a predetermined interval. This option for adjustment will preferably be provided by forming a series of attachment sites in the form of attachment eyes or bores on either the tool bar portion 40 or the central portion 20, said attachment sites allowing for releasable attachment of the rods 35–38. Alternatively the angles may be determined by means of a variable number of insertions 44 that are arranged between the end of a rod 35–38 and a respective flange 43 which may be mounted on an upper and/or a lower boom portion 20' of the central portion 20. Particularly conveniently actuators may be provided whereby the angular changes may be brought about automatically via a control unit which is advantageously arranged in the driver's cab of the tractor. The rods 35, 36, 37, 38 are pivotally connected to these attachment sites at both ends by means of e.g. swivel joints 39, e.g. ball bearings, whereby completely free or the desired movability of the rods is obtained.

Figure 4:
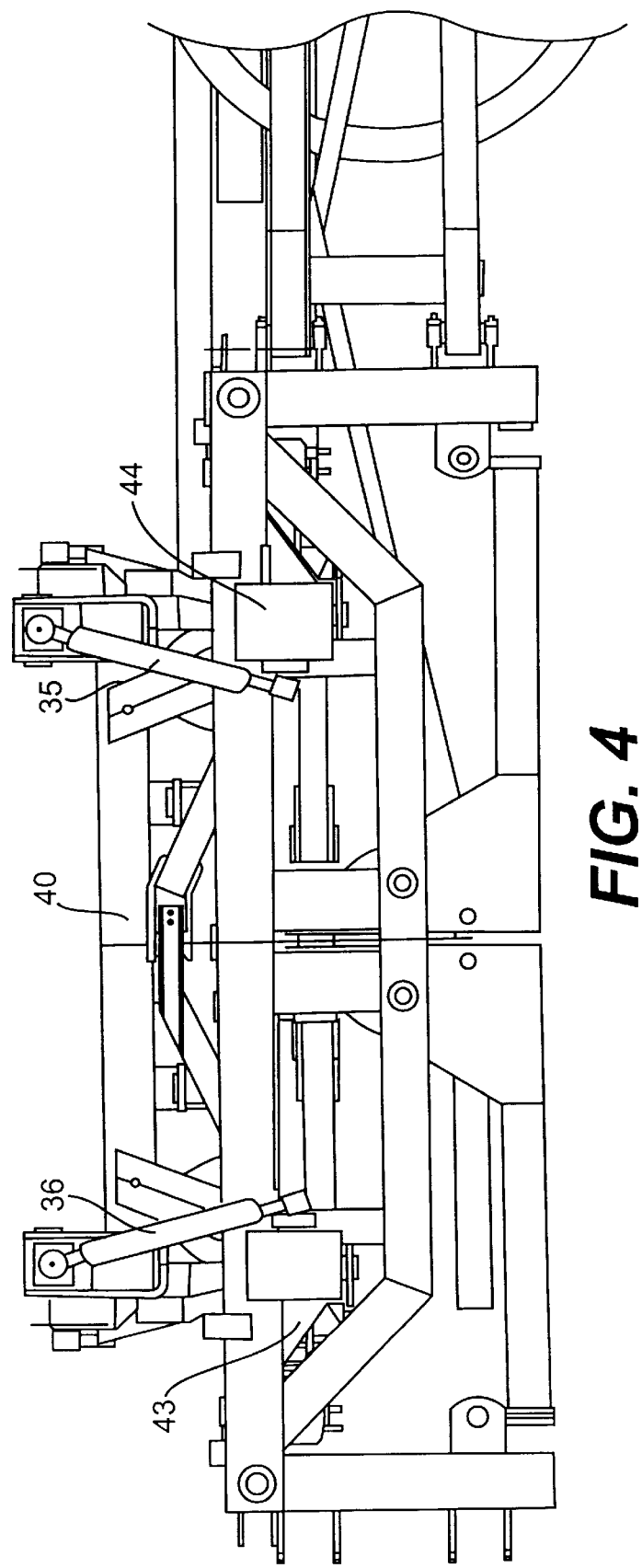
FIG. 4 is a top plan view of the suspension device according to the invention.

It is noted that the two pairs of rods need not necessarily extend in mutually parallel planes, but they may very well converge towards a point, e.g. the same point, which may be between the two pairs of rods. In this manner the resistance to turning of the boom construction is further enhanced. Moreover, as shown the point of convergence need not necessarily be situated in front of the boom construction as seen in the direction of advancement, but it may very well be situated behind the boom construction. The rod system 35–36 is shown in further detail in FIG. 4.

It is noted that the interval for α may advantageously be between 0 and 10 degrees whereby the system obtains different rigidities. The optimal angular setting in a given situation may be prescribed by the manufacturer and, as mentioned above, it will depend on the irregularity of the terrain and the speed with which driving takes place. Albeit the applicant does not wish to be bound by any particular theory, it should be mentioned that it has proved to be particularly advantageous to prescribe an increasing angle α with increasing boom lengths. A particularly advantageous angle interval is comprised between 1° and 9°.

As will appear from FIG. 5 the system A disclosed above may be a trapezoidal system with two springs 80 inserted between the fixed tool carrying bar 40 on the not shown tractor or trailer and its associated upper horizontal boom 100 in the trapezoidal system. In addition to the boom 100, the trapezoidal system A comprises three arms 120, 130 and 140, all of the elements 100, 120, 130 and 140 of the trapezoidal system A being mutually hinged in points X and Y. The arm 140 is rigid and may as shown be bent at its centre at 150, whereby this point 150 is caused to be in a higher plane than the points Y. The trapezoidal system A shown may be described as a V-shaped trapeze wherein the arms 120 and 130 converge towards a low point. This configuration is optimal but nothing prevents the arms 120, 130 from diverging away from a low point. Alternatively the arms 120 and 130 may be parallel. It will appear that the point 150 is displaced when the points Y move in the plane. The centre 150 on the arm 140 is via a swivel joint 150 connected to a vertical arm 170 that carries the boom construction 1 proper, the centre of gravity of the boom construction being a distance below the swivel joint 150. Thus the boom construction as a whole may pivot about a horizontal axis in point 150. By the boom construction pivoting like a pendulum about the point 150 with its centre of gravity at a distance therefrom, the further attenuating system B is provided which consequently functions in accordance with the principles of a pendulum. Reference is also made to French patent application No. 2 583 261. It should be noted that the system according to the present invention may very well be useful in connection with a pendulum system alone.

The attenuating system A is currently assumed to be suitable for attenuating low-frequency oscillations whereas system B is suitable for high-frequency oscillations, without the applicant thereby relying on any particular theory. Since the point 150 is, as mentioned, at a higher level than the points Y, the arm 140 not being rectilinear, a very compact construction is provided in which the pendulum arm extends partially between the points X and Y.

What is claimed is:

1. An agricultural appliance transportable on a land vehicle, comprising:
    a boom construction extendable in a direction perpendicular to travel of the land vehicle and having a central portion;
    a support construction mountable on the land vehicle and arranged parallel to the boom construction;
    a suspension device connecting the central portion of said boom construction with said support construction, said suspension device comprising means for allowing the boom construction to turn about an axis of rotation extending substantially horizontal and substantially perpendicular to the boom construction; and
    at least one pair of non-vertically extending one-piece, push/pull rods arranged in accordance with a preselected geometrical configuration, each rod being connected at one end by a swivel joint to a point on the boom construction and at an opposite end to a point on the support construction by another swivel joint;
    said push/pull rods of said pair being so arranged that one rod of the pair of rods is influenced by a pull simultaneously with the other rod of the pair being influenced by a push upon rotation of the boom construction about said axis of rotation.

2. An agricultural appliance according to claim 1, wherein each of the at least one pair of push/pull rods defines a line, said at least one pair of rods being arranged so that the defined lines intersect each other when extended.

3. An agricultural appliance according to claim 2, wherein the defined lines intersect behind the boom construction, relative to direction of travel by the land vehicle.

4. An agricultural appliance according claim 1, wherein the push/pull rods extend substantially horizontally.

5. An agricultural appliance according to claim 1, wherein said push/pull rods are arranged in a common plane spaced by a distance from the axis of rotation.

6. An agricultural appliance according to claim 1, comprising two pairs of non-vertically extending push/pull rods, the rods of each of the two pairs extending in a common plane, one of the two pairs extending above and the other of the two pairs extending below the axis of rotation.

7. An agricultural appliance according to claim 1, wherein the push/pull rods are detachable and extend from attachment sites on the boom construction to attachment sites on the support construction, and that for each rod, several attachment sites are provided in order to allow a variable adjustment of the angular setting of push/pull rods relative to the boom construction.

8. An agricultural appliance according to claim 7, wherein the central portion of the boom construction comprises substantially horizontal upper and lower booms, and that the attachment sites are in the form of a series of bores in said booms, said bores being spaced from each other by a distance determined by intended application of the agricultural appliance.

9. A method of providing variable attenuation of oscillations in a boom construction for a field sprayer carried by a land vehicle having a support construction thereon parallel to the boom construction, the method comprising the steps of:
    connecting opposite ends of each of at least two push/pull rods, by swivel joints, to the boom construction and to the support construction,
    mounting the boom construction pivotably about a substantially horizontal axis that extends in the direction of advancement of the agricultural appliance, and
    locating attachment sites for the push/pull rods in the boom construction as a series of bores spaced so that at least one rod is influenced by a pull simultaneously with at least one other rod being influenced by a push upon pivotal movement of the boom construction about said axis.

* * * * *